(12) United States Patent
Bando

(10) Patent No.: US 10,906,378 B2
(45) Date of Patent: Feb. 2, 2021

(54) RADIANT HEATER DEVICE

(71) Applicant: DENSO CORPORATION, Kariya (JP)

(72) Inventor: Shiro Bando, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 16/083,253

(22) PCT Filed: Feb. 22, 2017

(86) PCT No.: PCT/JP2017/006588
§ 371 (c)(1),
(2) Date: Sep. 7, 2018

(87) PCT Pub. No.: WO2017/154577
PCT Pub. Date: Sep. 14, 2017

(65) Prior Publication Data
US 2019/0070930 A1   Mar. 7, 2019

(30) Foreign Application Priority Data
Mar. 11, 2016   (JP) .................................. 2016-048435

(51) Int. Cl.
*B60H 1/22*   (2006.01)
*B60H 1/00*   (2006.01)

(52) U.S. Cl.
CPC ....... *B60H 1/2218* (2013.01); *B60H 1/00849* (2013.01); *B60H 1/22* (2013.01); *B60H 1/2226* (2019.05); *B60H 2001/00228* (2013.01)

(58) Field of Classification Search
None
See application file for complete search history.

(56) References Cited

U.S. PATENT DOCUMENTS

| 5,200,154 A * | 4/1993 | Harada | F01N 3/2026 219/541 |
|---|---|---|---|
| 2001/0045099 A1* | 11/2001 | Ohga | B60H 1/00971 62/186 |
| 2003/0150229 A1* | 8/2003 | Aoki | B60H 1/00285 62/244 |
| 2010/0065543 A1* | 3/2010 | Dubey | H05B 3/34 219/213 |
| 2012/0061365 A1* | 3/2012 | Okamoto | B60H 1/2225 219/202 |
| 2012/0234932 A1 | 9/2012 | Okamoto et al. | |
| 2012/0267354 A1* | 10/2012 | Okamoto | B60H 1/2227 219/202 |

(Continued)

FOREIGN PATENT DOCUMENTS

| JP | H08183320 A | 7/1996 |
|---|---|---|
| JP | 2005059821 A | 3/2005 |

(Continued)

*Primary Examiner* — Thor S Campbell
(74) *Attorney, Agent, or Firm* — Harness, Dickey & Pierce, P.L.C.

(57) ABSTRACT

A radiant heater device according to the present disclosure includes a radiant heater that radiates radiant heat to a passenger of a vehicle and a controller that controls an output of the radiant heater. The controller acquires information related to a thermal sensation of the passenger and controls the output of the radiant heater based on the information related the thermal sensation.

6 Claims, 14 Drawing Sheets

(56) References Cited

U.S. PATENT DOCUMENTS

| | | | |
|---|---|---|---|
| 2013/0206382 A1* | 8/2013 | Ichishi | B60N 2/5692 165/203 |
| 2015/0045981 A1* | 2/2015 | Mise | F24F 11/30 700/300 |
| 2015/0088316 A1* | 3/2015 | Mise | F24F 11/30 700/276 |
| 2015/0094914 A1* | 4/2015 | Abreu | B60H 1/00742 701/41 |
| 2015/0204556 A1* | 7/2015 | Kusukame | B60H 1/00742 165/237 |
| 2016/0039265 A1 | 2/2016 | Ota et al. | |
| 2016/0046174 A1 | 2/2016 | Sagou et al. | |
| 2016/0207375 A1* | 7/2016 | Gauthier | B60H 1/00771 |
| 2016/0325656 A1* | 11/2016 | Ziolek | B60N 2/5685 |
| 2016/0341603 A1* | 11/2016 | Kusukame | G01J 5/025 |
| 2017/0080779 A1 | 3/2017 | Sagou et al. | |
| 2018/0120873 A1* | 5/2018 | Radermacher | F24H 7/04 |
| 2019/0039433 A1* | 2/2019 | Wakisaka | B60H 1/00914 |
| 2019/0047449 A1* | 2/2019 | Fujii | B60N 2/565 |
| 2019/0054793 A1* | 2/2019 | Fujii | B60H 1/00535 |
| 2019/0063776 A1* | 2/2019 | Michimori | F24F 11/54 |

FOREIGN PATENT DOCUMENTS

| | | | |
|---|---|---|---|
| JP | 2005306095 A | 11/2005 | |
| JP | 2012192829 A | 10/2012 | |
| JP | 2014190674 A | 10/2014 | |
| JP | 2014208515 A | 11/2014 | |
| JP | 2015223917 A | 12/2015 | |
| JP | 2016022894 A | 2/2016 | |

\* cited by examiner

RADIANT HEATER DEVICE

CROSS REFERENCE TO RELATED APPLICATIONS

This application is a U.S. National Phase Application under 35 U.S.C. 371 of International Application No. PCT/JP2017/006588 filed on Feb. 22, 2017 and published in Japanese as WO/2017/154577 A1 on Sep. 14, 2017. This application is based on and claims the benefit of priority from Japanese Patent Application No. 2016-048435 filed on Mar. 11, 2016. The entire disclosures of all of the above applications are incorporated herein by reference.

TECHNICAL FIELD

The present disclosure relates to a radiant heater device.

BACKGROUND ART

A configuration in which a radiant heater device, which is installed in a vehicle cabin, is capable of heating an object using radiant heat is known. Regarding such a configuration, for example, Patent Document 1 describes controlling an output of the radiant heater according to a heat load that varies depending on a heating capacity required in a passenger compartment.

PRIOR ART DOCUMENT

Patent Document

[Patent Document 1] JP 2014-208515 A

SUMMARY

According to the control method of the radiant heater described in Patent Document 1, after a passenger stays within a passenger compartment for more than a certain period of time, and the body of the passenger has been sufficiently warmed up, a comfortable state is reached. However, as a result of detailed consideration by the inventor, an issue was found that, for example, for a passenger who has just entered the vehicle from outside and whose body is cold, a comfortable state may not be reached. For this reason, it is preferable to provide a heating equal to or higher than a calculated thermal load to a cold passenger or the like who has just entered from outside of a vehicle.

The present disclosure has been made in view of such issues, and an object thereof is to provide a radiant heater device capable of improving the thermal sensation of a passenger in a vehicle.

In order to solve the above-mentioned issue, a radiant heater device according to the present disclosure includes a radiant heater that radiates radiant heat to a passenger of a vehicle and a controller that controls an output of the radiant heater. The controller acquires information related to a thermal sensation of the passenger and controls the output of the radiant heater based on the information related the thermal sensation.

With this configuration, it is possible to provide appropriate heating according to the individual thermal sensation of a passenger, for example, by providing radiant heat with a relatively large output to a passenger with a cold body as compared with a sufficiently warm passenger. As a result, it is possible to improve the thermal sensation the heating sensation for each passenger of a vehicle.

According to the present disclosure, it is possible to provide a radiant heater device capable of improving the thermal sensation of a passenger of a vehicle.

DETAILED DESCRIPTION

Figure 1:
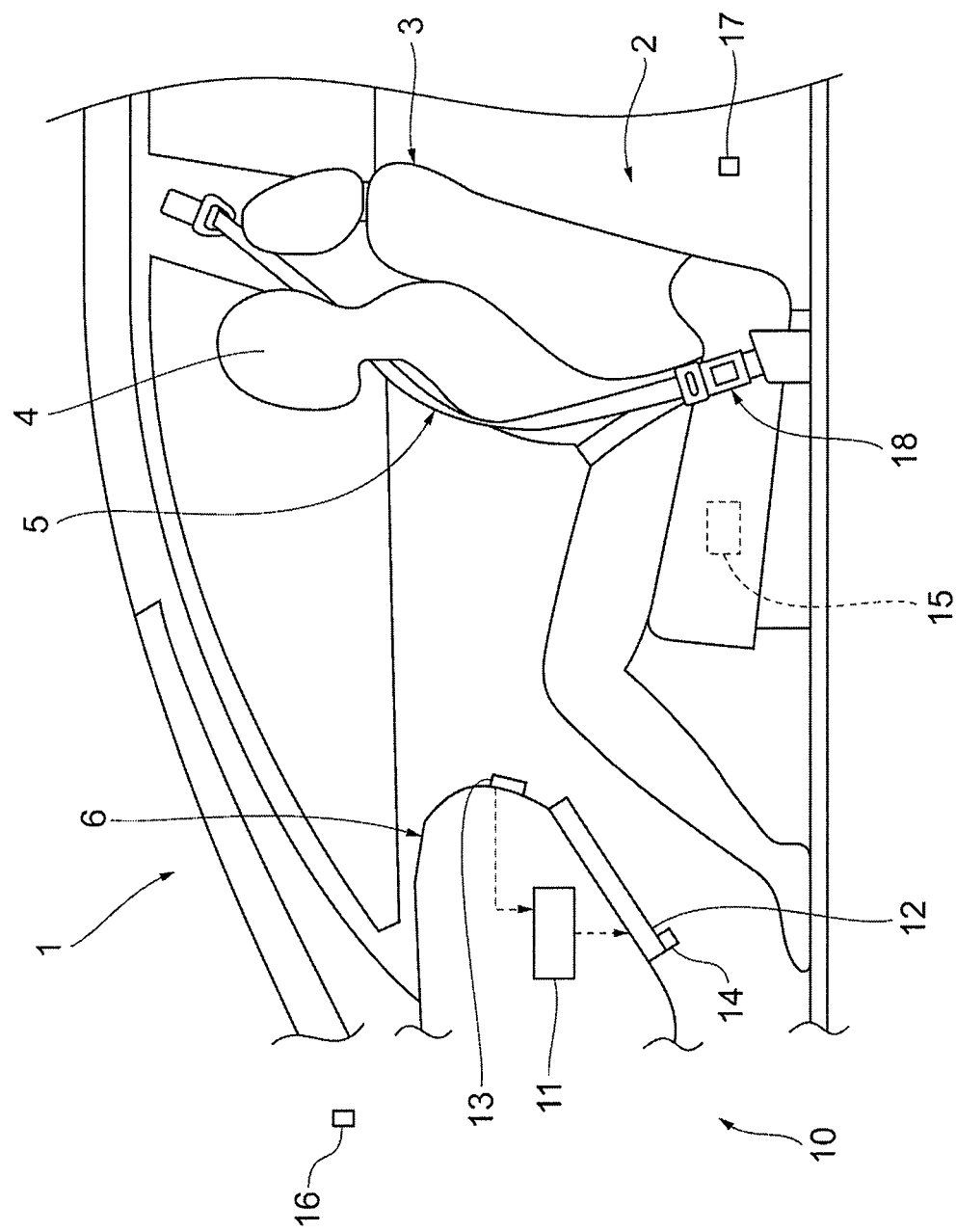
FIG. 1 is a diagram showing a schematic configuration of a vehicle interior of a vehicle provided with a radiant heater device according to a first embodiment of the present disclosure.
Figure 2:
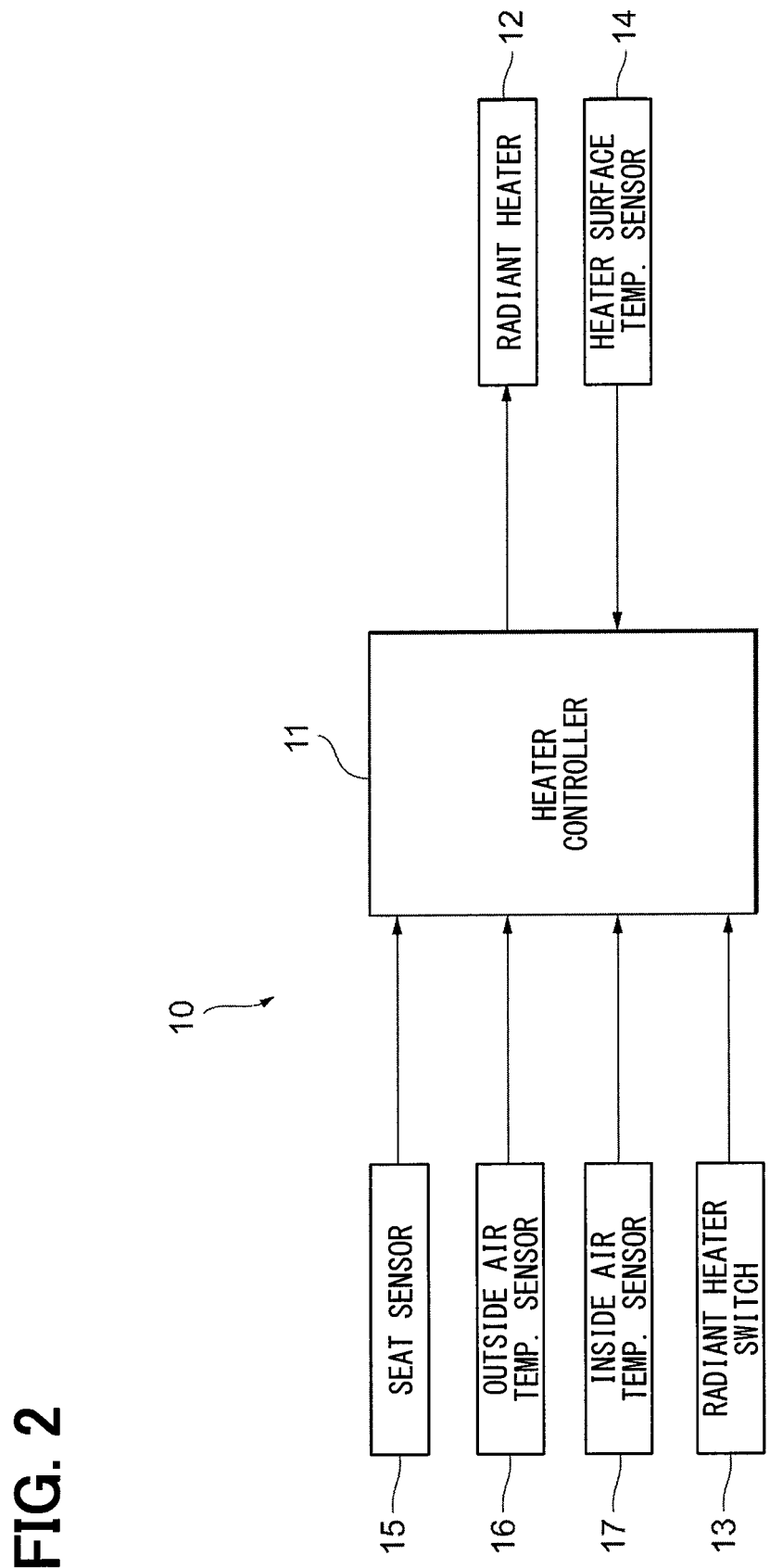
FIG. 2 is a block diagram showing a configuration of a radiant heater device according to a first embodiment.

Hereinafter, embodiments of the present disclosure will be described with reference to the attached drawings. In order to facilitate the ease of understanding, the same reference numerals are attached to the same constituent elements in each drawing where possible, and redundant explanations are omitted.

First Embodiment

A first embodiment will be described with reference to FIGS. 1 to 6. First, with reference to FIG. 1 and FIG. 2, the configuration of a radiant heater device 10 according to a first embodiment will be described.

The radiant heater device 10 is a heating device that uses radiant heat and forms a part of a heating device for the inside of a passenger compartment 2 of a vehicle 1. The radiant heater device 10 is an electric heater that is supplied with power from a power source, such as a battery or a generator or the like mounted in the vehicle 1, to generate heat. The radiant heater device 10 is disposed in the passenger compartment 2 so as to radiate radiant heat toward the feet of a passenger 4 seated in a seat 3 in the passenger compartment 2.

A seat sensor 15 for detecting a seating state of the passenger 4 is installed in each seat 3 of the vehicle 1. When the passenger 4 is seated on the seat 3 provided with the seat sensor 15, the seat sensor 15 transmits a seating signal indicating this state to an ECU or a heater controller 11 of the radiant heater device 10, which is described later, in the vehicle 1 (in other words, the seating signal turns on).

An outside air temperature sensor 16 that detects an outside air temperature which is a temperature outside the vehicle 1 and an inside air temperature sensor 17 that detects an inside air temperature which is a temperature inside the passenger compartment 2 of the vehicle 1 are disposed in the vehicle 1. The outside air temperature sensor 16 and the inside air temperature sensor 17 output information corresponding to the outside air temperature and inside air temperature to the ECU or the heater controller 11 of the radiant heater device 10, to be described later, in the vehicle 1.

Further, each seat 3 is provided with a buckle connection sensor 18 that detects the connection state of a buckle of a seatbelt 5. When the buckle of the seatbelt 5 of a seat provided with buckle connection sensor 18 is in a connected state, the buckle connecting sensor 18 transmits a buckle connection signal indicating this state to the ECU or the heater controller 11 of the radiant heater device 10, which is described later, in the vehicle 1 (in other words, the buckle connection signal turns on). The state in which the buckle connection sensor 18 outputs the buckle connection signal means that the passenger 4 is seated on the seat 3 where this sensor is installed and the passenger 4 is wearing the seatbelt 5. Accordingly, the buckle connection sensor 18 functions as a seatbelt sensor that detects a seatbelt attachment state of the passenger 4.

The radiant heater device 10 includes a heater controller 11, a radiant heater 12, a radiant heater switch 13, and a heater surface temperature sensor 14.

The heater controller 11 is a controller that controls the operation of the radiant heater 12. The heater controller 11 is electrically connected to the seat sensor 15, the outside air temperature sensor 16, the inside air temperature sensor 17, the radiant heater switch 13, the heater surface temperature sensor 14, and the radiant heater 12. The heater controller 11 controls the output of the radiant heater 12 based on various information input from the seat sensor 15, the outside air temperature sensor 16, the inside air temperature sensor 17, the radiant heater switch 13, and the heater surface temperature sensor 14.

The radiant heater 12 is a heat generating device capable of radiating radiant heat toward the passenger 4 of the vehicle 1. The radiant heater 12 is disposed in the passenger compartment 2 so as to radiate radiant heat toward the feet of the passenger 4 seated in the seat 3. The radiant heater 12 may be disposed on a wall surface inside the passenger compartment 2. For example, for the seat 3 on the front side of the vehicle 1, the radiant heater 12 can be disposed on the lower surface of an instrument panel 6 in front of the seat 3 so as to face the passenger 4.

The radiant heater switch 13 is an input device that accepts an input operation of the passenger 4 related to the operation of the radiant heater 12. When the radiant heater switch 13 is operated by the passenger 4 and turned to an ON state, the radiant heater switch 13 accepts an operation command to execute the operation of the radiant heater 12. Further, when the radiant heater switch 13 in an OFF state, an operation command to stop the operation of the radiant heater 12 is accepted. Furthermore, the radiant heater switch 13 may switch the output of the radiant heater 12 in multiple stages in the ON state. For example, the radiant heater switch 13 may switch the output of the radiant heater 12 between three stages: low output (Lo), middle output (Mi), or high output (Hi). The heater controller 11 may set a heater target temperature to be different under the same conditions in accordance with the stage selected by the radiant heater switch 13 (hereinafter referred to as a heater output setting signal).

The heater surface temperature sensor 14 detects the surface temperature of the radiant heater 12. The heater surface temperature sensor 14 outputs information corresponding to the surface temperature of the radiant heater 12 to the heater controller 11.

Next, the operation of the radiant heater device 10 according to the first embodiment will be described with reference to FIGS. 3 to 6. In the radiant heater device 10, the heater controller 11 is configured to acquire information related to the thermal sensation of the passenger 4, and to control the output of the radiant heater 12 based on this acquired information. Here, the "thermal sensation of the passenger 4" may be referred to as an index capable of representing, on a single scale, the sensation (thermal sensation) of heat and cold as sensed by the passenger 4.

In the first embodiment, the "information related to the thermal sensation of the passenger" obtained by the heater controller 11 refers to an elapsed time after the passenger 4 enters the vehicle 1, which is calculated based on information of the seating state of the passenger 4 detected by the seat sensor 15. Based on this elapsed time, the heater controller 11 switches the calculation method of the target temperature of the radiant heater 12. Specifically, when the elapsed time after the passenger 4 enters the vehicle 1 is less than a predetermined value, since the passenger 4 has just entered from the outside of the vehicle, the body of passenger 4 is considered to be cold as compared to a passenger that has continuously remained in the passenger compartment 2, and the thermal sensation of the passenger 4 is considered to be cold as well. Accordingly, the target temperature is corrected to be raised so as to supply a stronger radiant heat to the passenger. On the other hand, when the elapsed time is equal to or greater than the predetermined value, it is considered that sufficient time has elapsed since the passenger 4 entered the vehicle and that thermal sensation has sufficiently recovered. Accordingly a normal heater output control is performed by setting the target temperature based on the internal air temperature.

Figure 3:
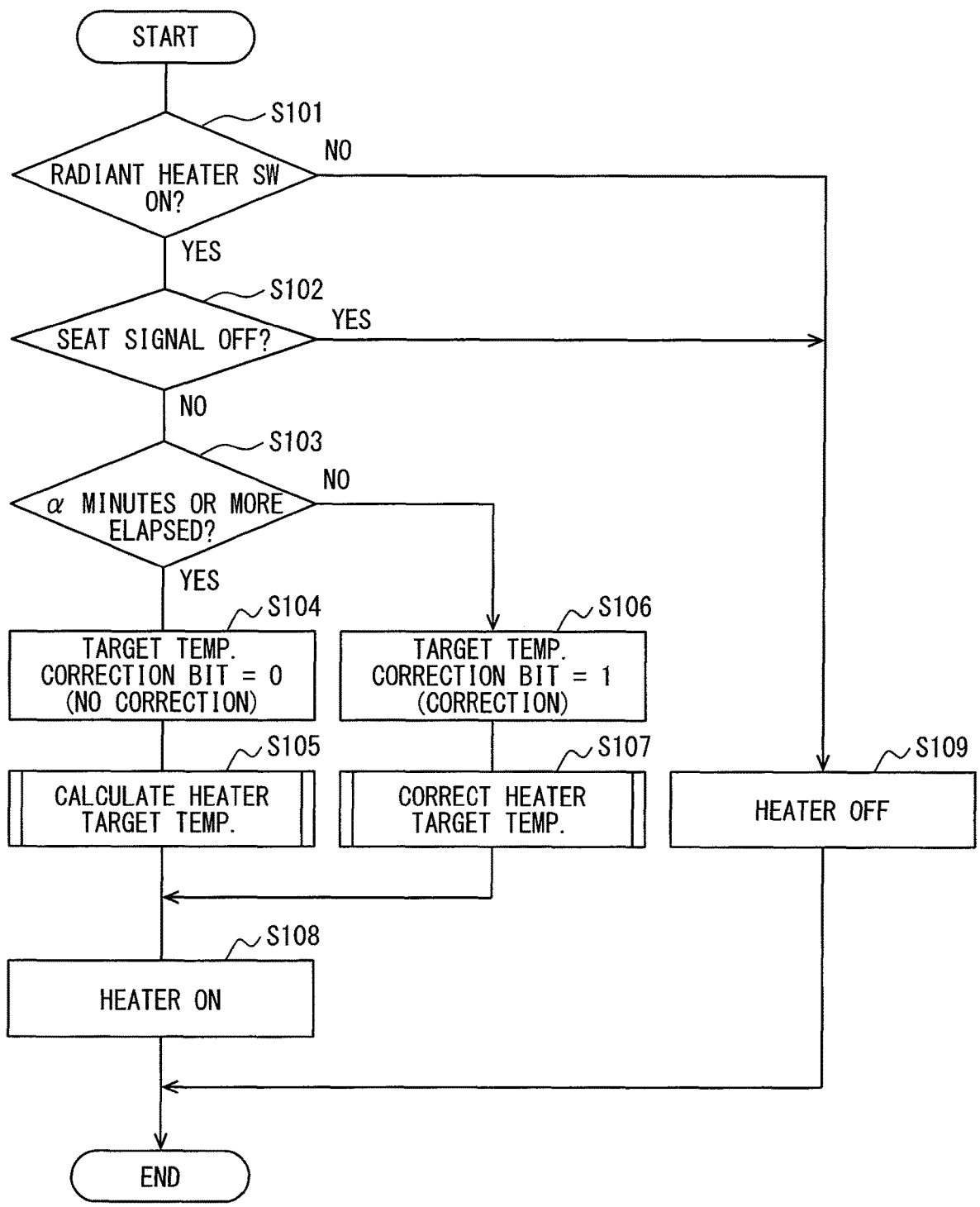
FIG. 3 is a flowchart showing a switching control of a target temperature calculation method of a radiant heater in a first embodiment.
Figure 4:
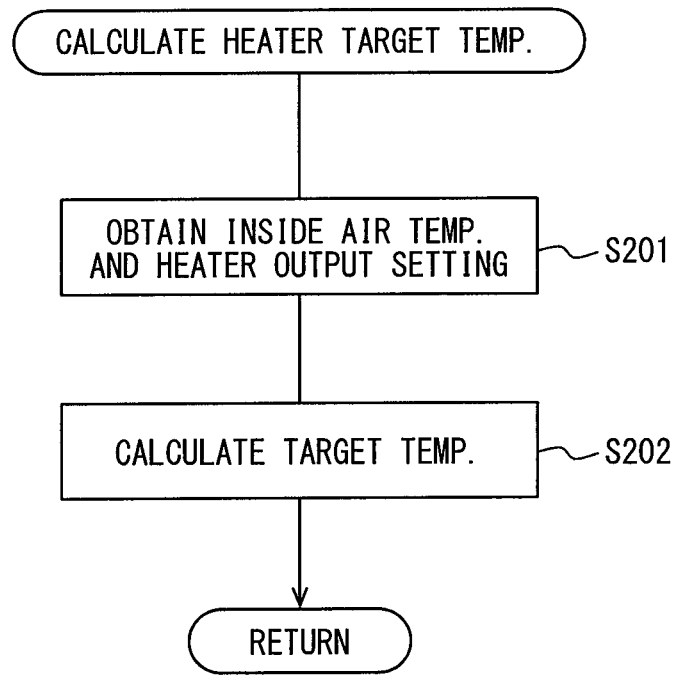
FIG. 4 is a flowchart showing a subroutine processing performed in the heater target temperature calculation processing in step S105 in FIG. 3.
Figure 5:
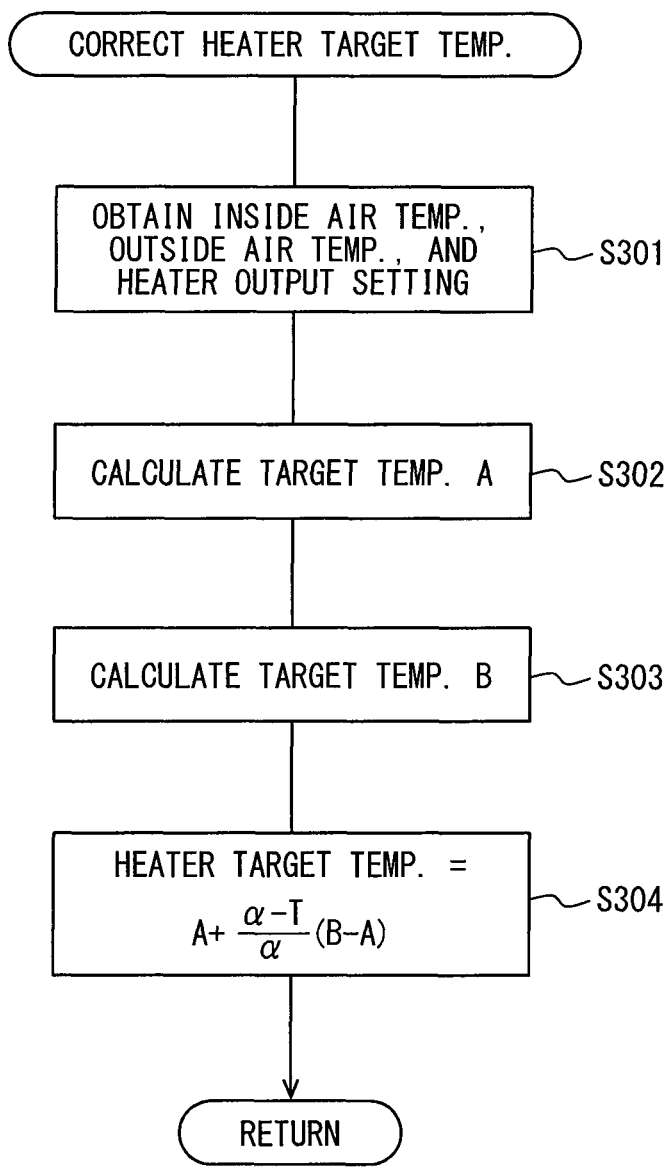
FIG. 5 is a flowchart showing a subroutine processing performed in the heater target temperature correction processing in step S107 in FIG. 3.

Hereinafter, a switching control of the target temperature calculation method of the radiant heater 12, which is performed by the radiant heater device 10, will be described with reference to the flowchart of FIG. 3. The process shown in FIG. 3 is executed by the heater controller 11, for example, at predetermined intervals.

In step S101, it is determined whether or not the radiant heater switch (SW) 13 is in the ON state. When the radiant heater switch 13 in the ON state (Yes in step S101), the process proceeds to step S102. When the radiant heater switch 13 is in the OFF state (No in step S101), the process proceeds to step S109.

In step S102, it is determined whether or not the seating signal input from the seat sensor 15 is in the OFF state. When the seating signal is in the ON state (No in step S102), the process proceeds to step S103. When it is in the OFF state (Yes in step S102), the process proceeds to step S109.

In step S103, the result of the determinations in steps S101 and S102 is that the radiant heater switch 13 is in the ON state and the seating signal is in the ON state. Accordingly, the radiant heater 12 is in operation the passenger 4 is seated in the seat 3. Thus, at step S103, it is determined whether or not a predetermined a minutes or more has elapsed since the seating signal was turned on. If a minutes or more have elapsed since the seating signal was turned on (Yes in step S103), the process proceeds to step S104. When the time elapsed since the seating signal was turned on is less than a minutes (No in step S103), the process proceeds to step S106.

In step S104, the result of the determination in step S104 is that the particular time since the passenger sat on the seat is equal to or greater than a minutes. Accordingly, in order to use a normal target temperature calculation method, a target temperature correction bit is set to 0. Upon completion of the process of step S104, the process proceeds to step S105.

In step S105, a "heater target temperature calculation" process, which is a normal target temperature calculation method, is performed. The specific processing of the "heater target temperature calculation" is steps S201 to S202 in the subroutine processing shown in FIG. 4.

In step S201, information of the inside air temperature is acquired from the inside air temperature sensor 17, and information of the heater output setting (Hi, Mi, Lo) is acquired from the radiant heater switch 13.

Figure 6:
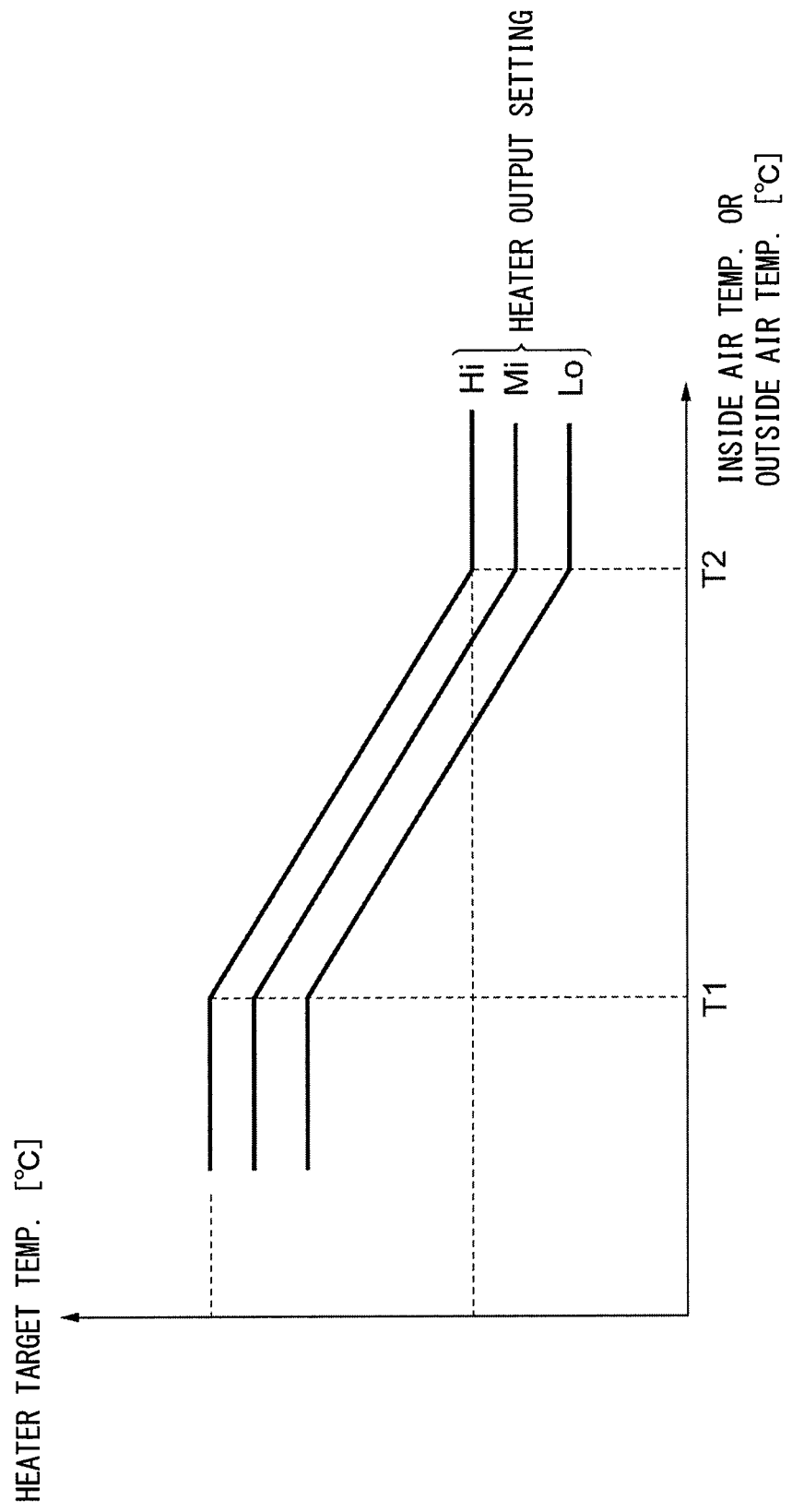
FIG. 6 is a diagram showing an example of a heater target temperature characteristic used in a first embodiment.

In step S202, the target temperature is calculated from a predetermined heater target temperature characteristic based on the inside air temperature and the heater output setting acquired in step S201. Here, for example, the characteristics shown in FIG. 6 can be used as the heater target temperature characteristic. The horizontal axis of FIG. 6 represents the inside air temperature or outside air temperature [° C.] (inside air temperature in this case), and the vertical axis of FIG. 6 represents the heater target temperature [° C.]. In FIG. 6, three types of characteristics indicating the corresponding relationship between the inside air temperature and the target temperature are set in accordance with three stages of heater output settings. These three types of characteristics are similar to each other in that the target temperature is at a maximum value when the inside air temperature is equal to or less than a predetermined low temperature T1, the target temperature monotonically decreases as the inside air temperature increases in a region between the low temperature T1 and a high temperature T2, and the target temperature is at a minimum value when the inside air temperature is at the high temperature T2. In addition, these three types of characteristics are set such that the maximum value and the minimum value of the target temperature decreases stepwise in the order of Hi, Mi, and Lo of the heater output setting. When the process of step S202 is completed, the process returns to the main flowchart, and the process proceeds to step S108.

In step S106, the result of the determination in step S104 is that the predetermined time since the passenger sat on the seat is less than a minutes. Accordingly, the target temperature correction bit is set to 1 so as to temporarily correct and raise the target temperature. Upon completion of the process of step S106, the process proceeds to step S107.

In step S107, a "heater target temperature correction" process, which is a process for temporarily correcting the target temperature to raise the target temperature, is performed. The specific processing of the "heater target temperature correction" is steps S301 to S304 in the subroutine processing shown in FIG. 5.

In step S301, information of the inside air temperature is acquired from the inside air temperature sensor 17, information of the outside air temperature is acquired from the outside air temperature sensor 16, and information of the heater output setting (Hi, Mi, Lo) is acquired from the radiant heater switch 13.

In step S302, a target temperature A is calculated from a predetermined heater target temperature characteristic based on the inside air temperature and the heater output setting acquired in step S301. Here, for example, the characteristics shown in FIG. 6 can be used as the heater target temperature characteristic in the same manner as in step S202.

In step S303, a target temperature B is calculated from a predetermined heater target temperature characteristic based on the outside air temperature and the heater output setting acquired in step S301. Here, for example, the characteristics shown in FIG. 6 can be used as the heater target temperature characteristic in the same manner as in steps S202 and S302. In this step, the horizontal axis of FIG. 6 is the outside air temperature [° C.].

In step S304, the heater target temperature is calculated using the target temperature A calculated in step S302 based on the inside air temperature and the target temperature B calculated in step S303 based on the outside air temperature. The heater target temperature can be calculated by the following Equation (1), for example.

[Equation 1]

$$\text{Heater Target Temperature} = A + \frac{a-T}{a}(B-A) = A + k + C \quad (1)$$

Here, A is a target temperature [° C.] calculated in step S302 based on the inside air temperature, and B is a target temperature [° C.] calculated in step S303 based on the outside air temperature. C is the difference (B−A) [° C.] between the target temperature B and the target temperature A, and C=0 when C≤0. T is the elapsed time [minutes] after the seating signal is switched from the OFF state to the ON state, and a is a predetermined time [minutes], for example 5 minutes. In addition, a also functions as a reference value for switching between the heater target temperature calculation processing in step S105 and the heater target temperature correction processing in step S107. Further, k is a coefficient that varies according to the elapsed time T. Here, k becomes closer to 1 as the elapsed time T approaches 0, and becomes closer to 0 as the elapsed time approaches α.

Heater Target Temperature

Here, the equation (1) will be further described. The first term (A) on the right side is the target temperature calculated from the heater target temperature characteristic shown in FIG. 6 based on the inside air temperature and the heater output setting, and is the same as the heater target temperature calculated from the normal target temperature calculation method in step S105. The second term (k*C) on the right side functions as a correction term for raising the target temperature A in the first term. In the second term, k is a variable that varies according to the elapsed time T, and C is a variable determined by the difference between the target temperature B and the target temperature A. In the second term, the shorter the elapsed time T is, the larger the raise amount is, and as the elapsed time T approaches the predetermined time a, the raise amount tends to become smaller. Further, the second term tends to increase the raise amount as the difference between the target temperature B based on the outside air temperature and the target temperature A based on the inside air temperature increases, i.e., as the outside air temperature becomes lower than the inside air temperature. Further, the second term tends to decrease the raise amount as the outside air temperature approaches the inside air temperature. When the process of step S304 is completed, the process returns to the main flowchart, and the process proceeds to step S108.

In step S108, the radiant heater 12 is controlled to be in an ON state, and the output of the radiant heater 12 is controlled based on the heater target temperature calculated in step S105 or step S107. The heater controller 11 performs feedback control on the output of the radiant heater 12 based on the information of the actual surface temperature of the radiant heater 12 inputted from the heater surface temperature sensor 14. Accordingly, the heater controller 11 is able to set the surface temperature of the radiant heater 12 to the heater target temperature. Upon completion of the process of step S108, this control process ends.

In step S109, the result of the determinations in steps S101 and S102 is that the radiant heater switch 13 is in the OFF state or the seating signal is in the OFF state. Accordingly, the radiant heater 12 is controlled to be in the OFF state, and this control process ends.

Next, the effects of the radiant heater device 10 according to the first embodiment will be described.

Consider a configuration where the heating target of a radiant heater is the passenger 4 seated in the passenger compartment 2 of the vehicle 1. In conventional control methods for a radiant heater, for example as in Patent Document 1, there is proposed a control method which varies an output of the radiant heater according to a heat load that varies depending on a heating capacity required in the passenger compartment 2. With these control methods, if the passenger 4 has been riding in the passenger compartment 2 for more than a certain period of time and the body of the passenger 4 is sufficiently warm, then the passenger 4 is in a comfortable state. However, it is thought that there are cases where a greater heating sensation than the calculated thermal load is required, for example if the passenger 4 has just entered the vehicle from outside and the body of the passenger 4 is cold. In such cases, there is a concern that sufficient heating may not be provided to the passenger 4.

In this regard, the radiant heater device 10 of the first embodiment includes a radiant heater 12 that radiates radiant heat to the passenger 4 of the vehicle 1, and a heater controller 11 that controls the output of the radiant heater 12. The heater controller 11 acquires "information related to thermal sensation of the passenger 4" and controls the output of the radiant heater 12 based on this information.

For example, when comparing a passenger 4 who has been in the passenger compartment 2 for more than a certain period of time and whose body is sufficiently warm with a cold passenger 4 who has just entered from outside of the vehicle, even if the temperature in the passenger compartment 2 is the same, these passengers will feel different thermal sensations (that is, an index which represents the sensation of heat and cold (hot and cold sensations) sensed by the passenger 4 on a single scale) will be different. Due to the above described configuration, the radiant heater device 10 according to the first embodiment is capable of controlling the output of the radiant heater 12 based on "the information related to the thermal sensation of the passenger 4". Accordingly, it is possible to provide appropriate heating according to the individual thermal sensation of the passenger 4, for example, by providing radiant heat with a relatively large output to a passenger 4 with a cold body as compared with a sufficiently warm passenger 4. As a result, it is possible to improve the thermal sensation the heating sensation for each passenger 4 in the vehicle 1.

Further, the above described "control output of the radiant heater 12 based on the information related to the thermal sensation of the passenger 4" with respect to the radiant heater device 10 of the first embodiment refers to the following specific configuration. That is, the heater controller 11 calculates an elapsed time after the passenger 4 enters the vehicle 1 as "information related to the thermal sensation of the passenger 4" based on information of the seating state of the passenger 4 as detected by the seat sensor 15. Then, the heater controller 11 switches the calculation method of the target temperature of the radiant heater 12 based on this elapsed time.

It is considered that the elapsed time after the passenger 4 enters has a high correlation with the thermal sensation of the passenger 4. For example, it is considered that if the elapsed time is short, the body of the passenger 4 is cold and thermal sensation is low, and if the elapsed time is long, the body of the passenger 4 is sufficiently warmed and thermal sensation is high. As described above, by switching the calculation method of the target temperature of the radiant heater 12 based on the elapsed time, it is possible to provide an appropriate heating according to the thermal sensation of the passenger 4.

In the radiant heater device 10 according to the first embodiment, the heater controller 11 sets the target temperature based on the inside air temperature, which is the temperature in the passenger compartment 2 of the vehicle 1, when the elapsed time after the passenger 4 enters the vehicle 1 is equal to or greater than the predetermined value a minutes, and performs a correction that raises the target temperature when the elapsed time is less than the predetermined value a.

With this configuration, when the elapsed time after the passenger 4 enters the vehicle 1 is short and the thermal sensation of the passenger 4 is relatively low, the target temperature of the radiant heater 12 can be raised to greater output than during normal operation, such that the thermal sensation of the passenger 4 may be appropriately improved.

Further, the above described "correction that raises the target temperature" with respect to the radiant heater device 10 of the first embodiment refers to the following specific configuration. That is, as described with reference to Equation (1), the heater controller 11 performs a correction to raise the target temperature such that the shorter the elapsed time, the greater the raise amount, and the lower the outside air temperature which is the temperature outside the vehicle 1 is with respect to the inside air temperature, the greater the raise amount. With this configuration, it is possible to appropriately correct the target temperature of the radiant heater 12 necessary for improving the thermal sensation of the passenger 4.

Second Embodiment

Figure 7:
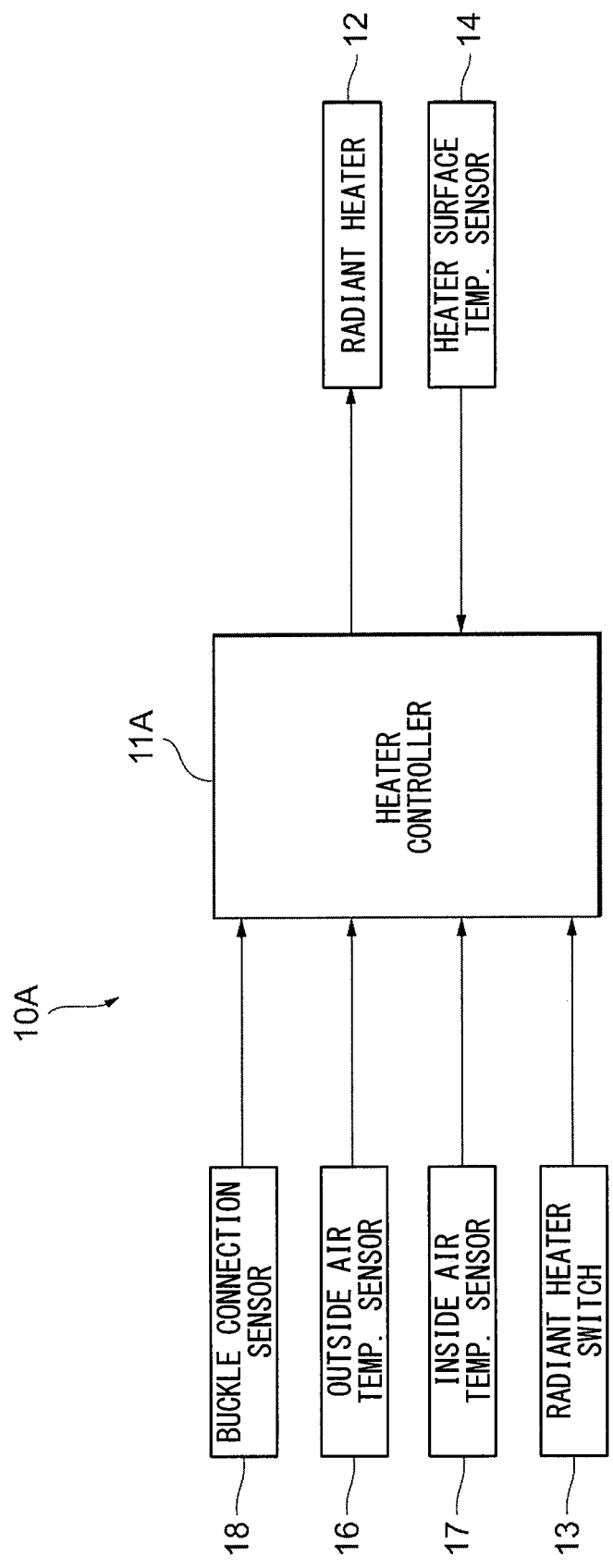
FIG. 7 is a block diagram showing a configuration of a radiant heater device according to a second embodiment.
Figure 8:
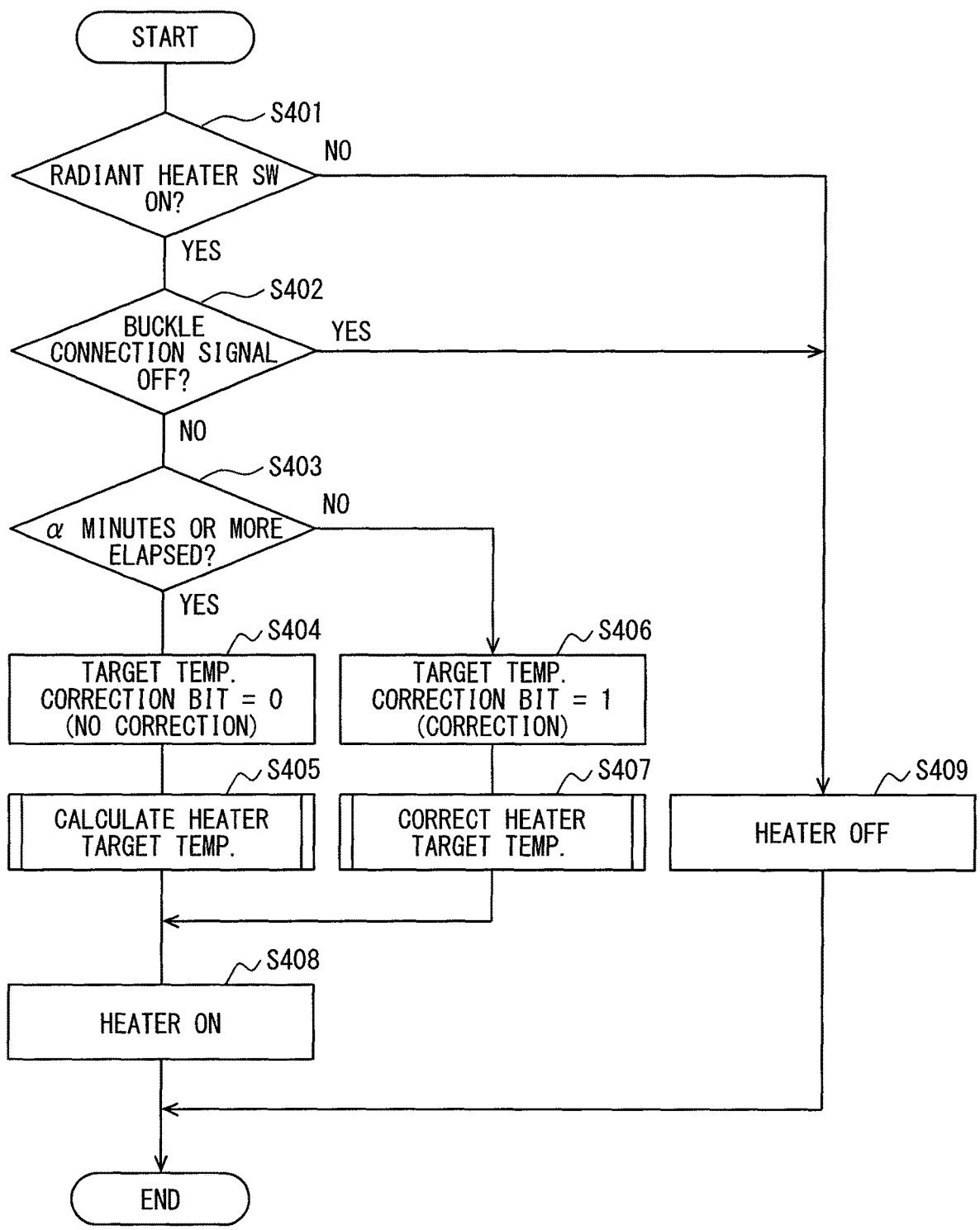
FIG. 8 is a flowchart showing a switching control of a target temperature calculation method of a radiant heater in a second embodiment.

A second embodiment will be described with reference to FIGS. 7 and 8. As shown in FIG. 7, a radiant heater device 10A according to the second embodiment is different from the radiant heater device 10 of the first embodiment in that instead of the seating information acquired from the seat sensor 15, a buckle connection signal acquired from the buckle connection sensor 18 is used as input information instead.

The operation of the radiant heater device 10A according to the second embodiment will be described with reference to the flowchart of FIG. 8. Since the processes in steps S401 and S404 to S409 in the flowchart of FIG. 8 are the same as the processes in steps S101 and S104 to S109 in the flowchart of FIG. 3, the description thereof will be omitted. As in the first embodiment, the heater target temperature calculation processing in step S405 performs the subroutine processing shown in FIG. 4, and the heater target temperature correction processing in step S407 performs the subroutine of FIG. 5.

In step S402, it is determined whether or not the buckle connection signal input from the buckle connection sensor 18 is in the OFF state. When the buckle connection signal is in the ON state (No in step S402), the process proceeds to step S403. When it is in the OFF state (Yes in step S402), the process proceeds to step S409.

In step S403, the result of the determinations in steps S401 and S402 is that the radiant heater switch 13 is in the ON state and the buckle connection signal is in the ON state. Accordingly, the radiant heater 12 is in operation the passenger 4 is seated in the seat 3 with the seatbelt buckled. Thus, at step S403, it is determined whether or not a predetermined a minutes or more has elapsed since the buckle connection signal was turned on. If a minutes or more have elapsed since the buckle connection signal was turned on (Yes in step S403), the process proceeds to step S404. When the time elapsed since the buckle connection signal was turned on is less than a minutes (No in step S403), the process proceeds to step S406.

In the radiant heater device 10A of the second embodiment, the above mentioned "control output of the radiant heater 12 based on the information related to the thermal sensation of the passenger 4" refers to the following specific configuration. That is, the heater controller 11A calculates an elapsed time after the passenger 4 enters the vehicle 1 as "information related to the thermal sensation of the passenger 4" based on information of the seatbelt wearing state of the passenger 4 as detected by the buckle connection sensor 18. Then, the heater controller 11 switches the calculation method of the target temperature of the radiant heater 12 based on this elapsed time.

As described above, the radiant heater device 10A of the second embodiment has the same features as those of the first embodiment in that the method of calculating the target temperature of the radiant heater 12 is switched based on a time elapsed since the passenger 4 has entered the vehicle. Accordingly, the same effects as those in the first embodiment can be obtained.

Third Embodiment

A third embodiment will be described with reference to FIGS. 9 to 13. As shown in FIG. 10, a radiant heater device 10B according to the third embodiment is different from the first and second embodiments in that an IR (infrared) sensor 19 is used as input information. Further, as shown in FIG. 10, the heater controller 11B is different from the first and second embodiments in that information from the seat sensor 15, the outside air temperature sensor 16, the inside air temperature sensor 17, and the buckle connection sensor 18 is not used.

Figure 9:
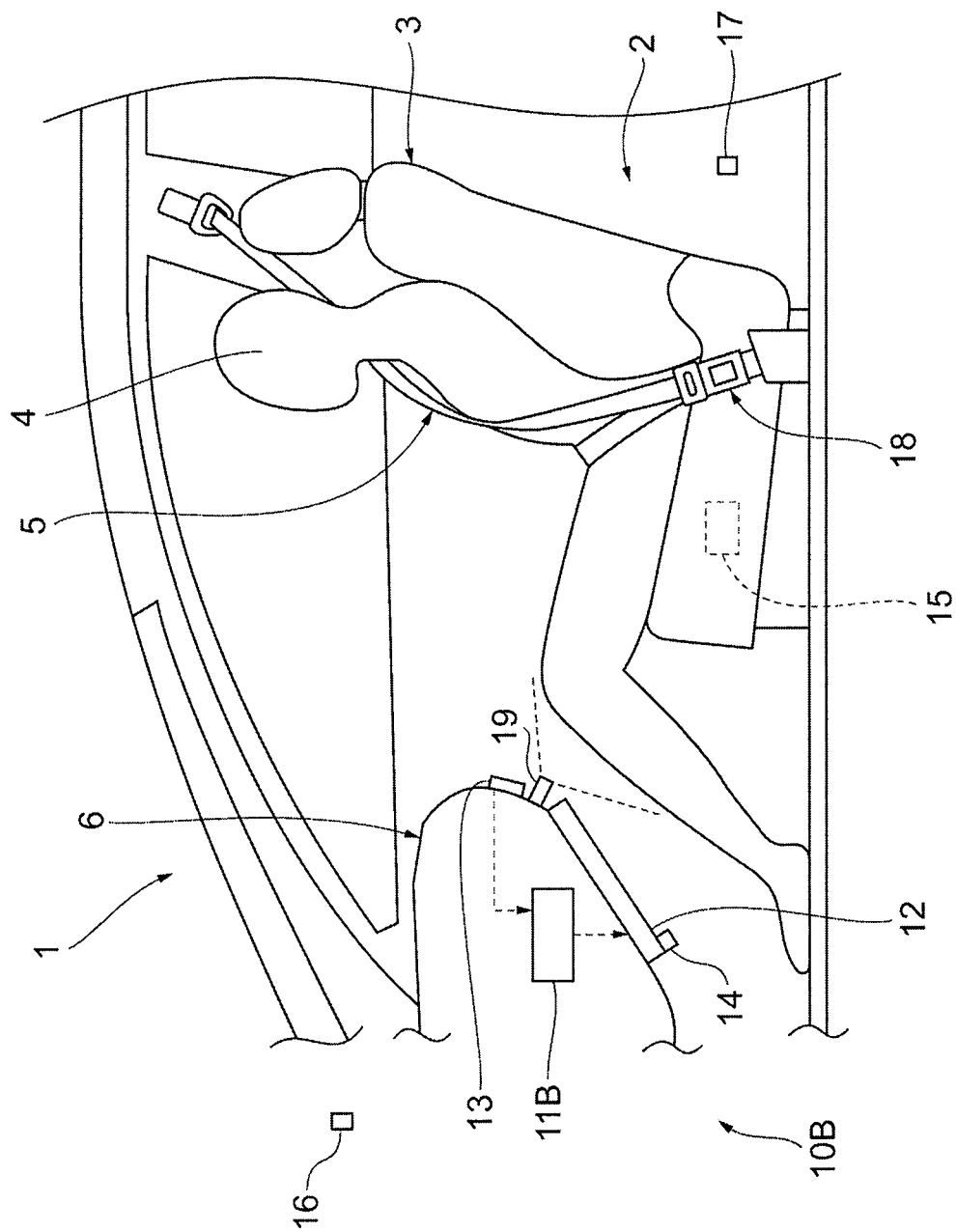
FIG. 9 is a diagram showing a schematic configuration of a vehicle interior of a vehicle provided with a radiant heater device according to a third embodiment.
Figure 10:
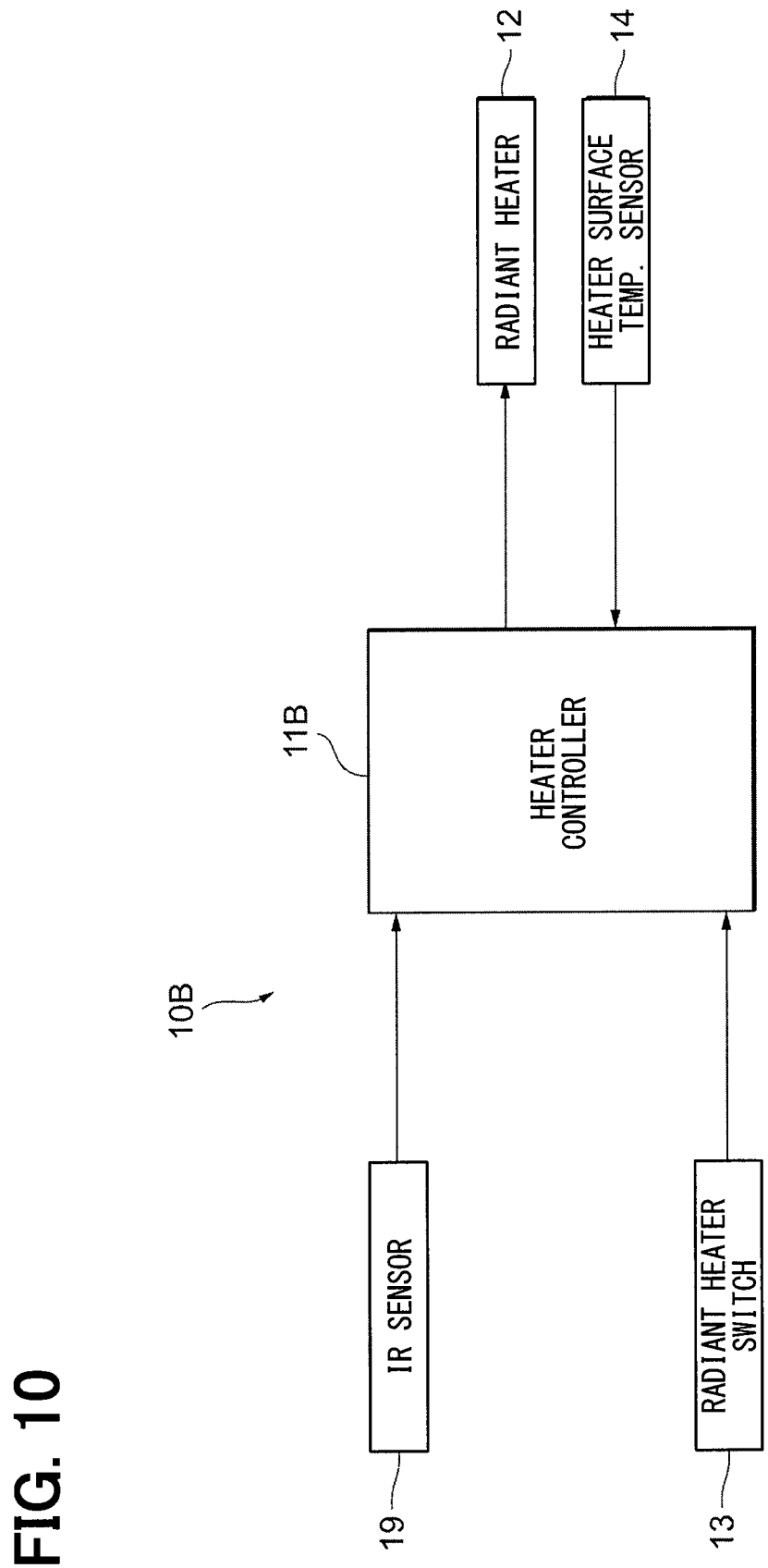
FIG. 10 is a block diagram showing a configuration of a radiant heater device according to a third embodiment.

As shown in FIGS. 9 and 10, the vehicle 1 is provided with the IR sensor 19. The IR sensor 19 detects the surface temperature of human bodies. The IR sensor 19 is disposed, for example in the vicinity of the radiant heater 12, so as to detect the surface temperature of a portion of the passenger 4 (for example, a foot portion below the knee) irradiated with radiant heat from the radiant heater 12. The IR sensor 19 outputs information corresponding to the temperature of the detection area to the ECU in the vehicle 1 or to the heater controller 11B of the radiant heater device 10B.

Figure 11:
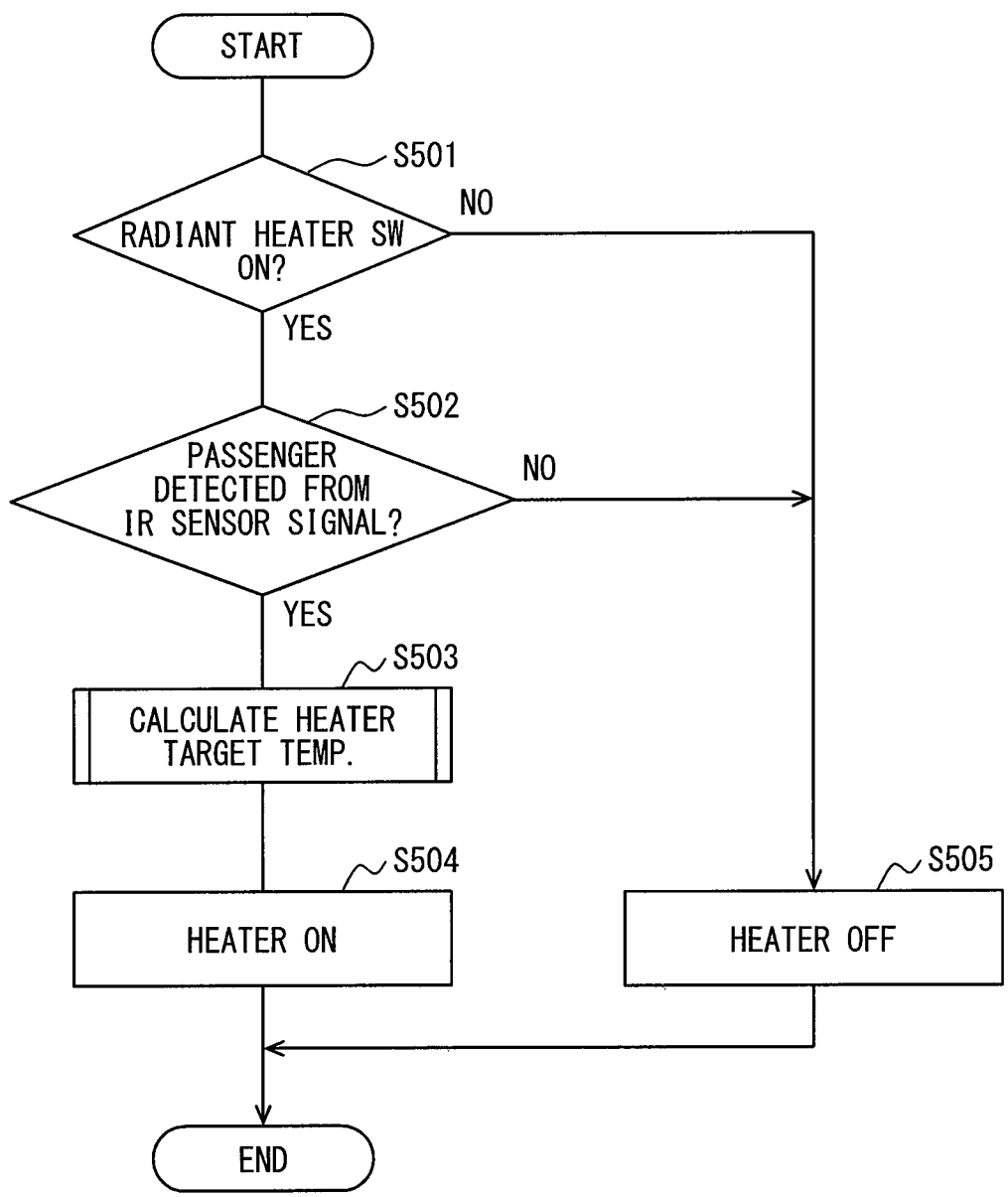
FIG. 11 is a flowchart showing a target temperature calculation control of a radiant heater according to a third embodiment.
Figure 12:
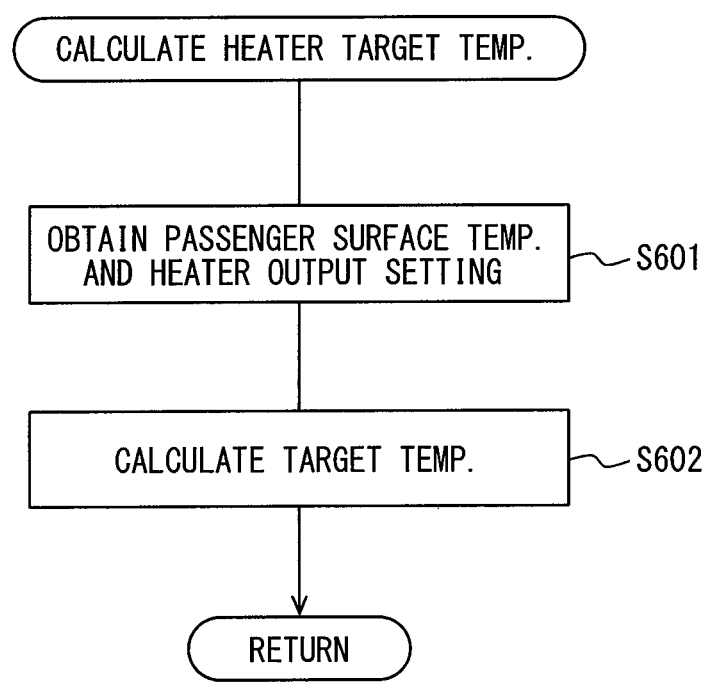
FIG. 12 is a flowchart showing a subroutine processing performed in the heater target temperature calculation processing in step S503 in FIG. 11.
Figure 13:
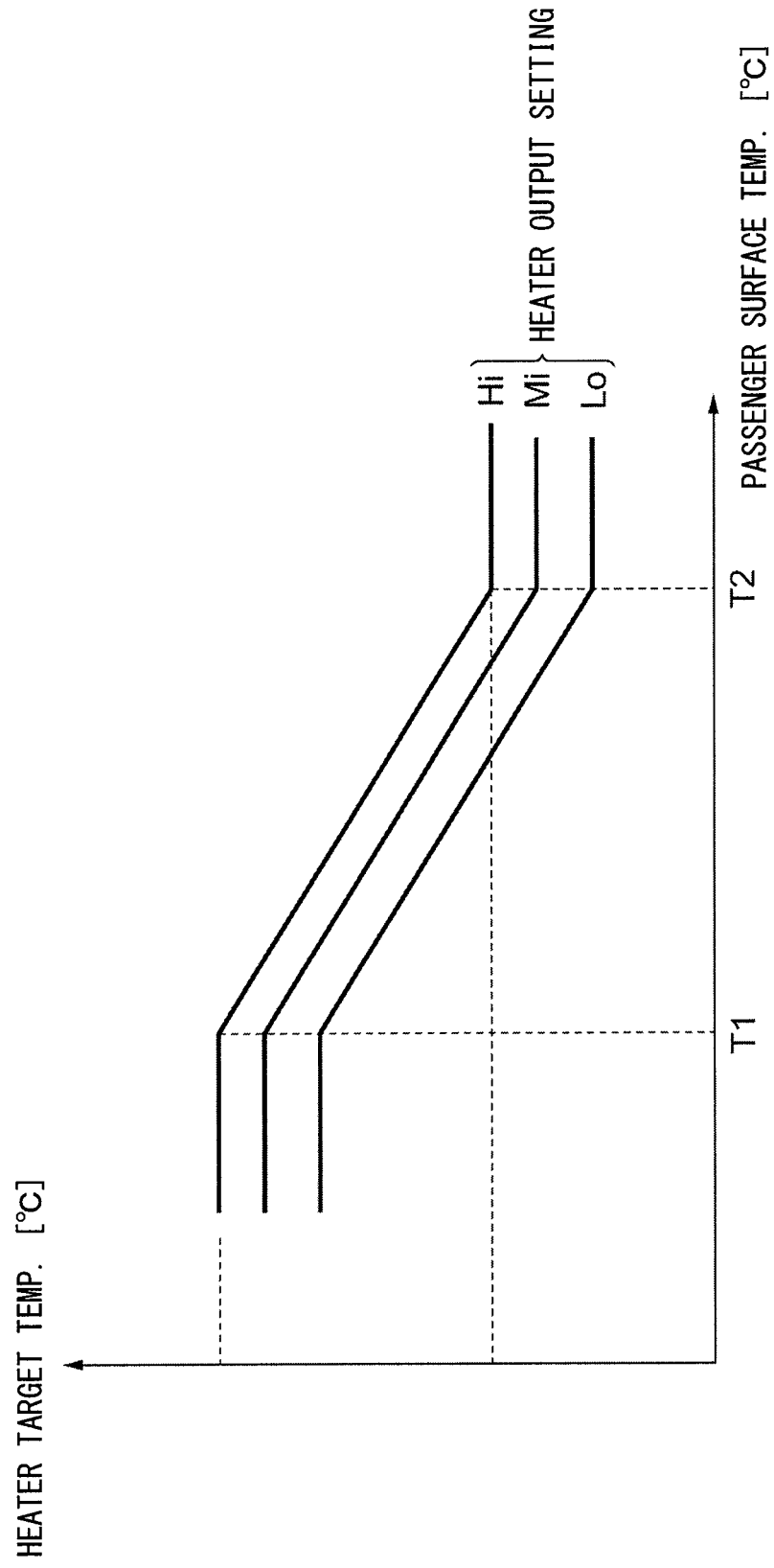
FIG. 13 is a diagram showing an example of a heater target temperature characteristic used in a third embodiment.

Next, the operation of the radiant heater device 10B according to the third embodiment will be described with reference to FIGS. 11 to 13. In the third embodiment, the information of the surface temperature of the foot of the passenger 4 detected by the IR sensor 19 is used as the "information related to the thermal sensation of the passenger" which is acquired by the heater controller 11B. The heater controller 11 sets the target temperature of the radiant heater 12 based on this surface temperature. Specifically, as the surface temperature is lower, the heater target temperature is set to be relatively higher, because it is considered that the passenger 4 has just entered the interior of the vehicle from the outside of the vehicle, so the body of the passenger 4 is colder than a passenger who has continuously stayed within the passenger compartment 2, and the thermal sensation of the passenger 4 is cold. Conversely, as the surface temperature is higher, the heater target temperature is set to be relatively lower, because it is considered that sufficient time has elapsed since the passenger 4 entered the vehicle, and the thermal sensation of the passenger 4 has sufficiently recovered.

Hereinafter, a calculation control of the target temperature of the radiant heater 12, which is performed by the radiant heater device 10B, will be described with reference to the flowchart of FIG. 11. The process shown in FIG. 11 is executed by the heater controller 11B, for example, at predetermined intervals.

In step S501, it is determined whether or not the radiant heater switch (SW) 13 is in the ON state. When the radiant heater switch 13 in the ON state (Yes in step S501), the process proceeds to step S502. When the radiant heater switch 13 is in the OFF state (No in step S501), the process proceeds to step S505.

In step S502, it is determined whether the presence of the passenger 4 can be detected by an IR sensor signal input from the IR sensor 19. For example, when the IR sensor signal detects a temperature distribution different from the surface temperature of the seat 3, the heater controller 11B is able to determine that the passenger 4 is in the seat 3. When the passenger 4 is detected (Yes in step S502), the process proceeds to step S503. When the passenger 4 can not be detected (No in step S502), the process proceeds to step S505.

In step S503, the result of the determinations in steps S501 and S502 is that the radiant heater switch 13 is ON and the passenger 4 can be detected by the IR sensor signal. Accordingly, a "heater target temperature calculation" process is performed. The specific processing of the "heater target temperature calculation" is steps S601 to S602 shown in FIG. 12.

In step S601, information of the surface temperature of the passenger 4 is acquired from the IR sensor 19, and information of the heater output setting (Hi, Mi, Lo) is acquired from the radiant heater switch 13.

In step S602, the target temperature is calculated from a predetermined heater target temperature characteristic based on the passenger surface temperature and the heater output setting acquired in step S601. Here, for example, the characteristics shown in FIG. 13 can be used as the heater target temperature characteristic. The horizontal axis of FIG. 13 represents the passenger surface temperature [° C.], and the vertical axis of FIG. 13 represents the heater target temperature [° C.]. The characteristic chart shown in FIG. 13 is similar to the characteristic chart shown in FIG. 6 in other respects. When the process of step S602 is completed, the process returns to the main flowchart, and the process proceeds to step S504.

In step S504, the radiant heater 12 is controlled to be in an ON state, and the output of the radiant heater 12 is controlled based on the heater target temperature calculated in step S503. The heater controller 11B performs feedback control on the output of the radiant heater 12 based on the information of the actual surface temperature of the radiant heater 12 inputted from the heater surface temperature sensor 14. Accordingly, the heater controller 1 is able to set the surface temperature of the radiant heater 12 to the heater target temperature. Upon completion of the process of step S504, this control process ends.

In step S505, the result of the determinations in steps S501 and S502 is that the radiant heater switch 13 is in the OFF state or that the passenger 4 was not able to be detected from the IR sensor signal. Accordingly, the radiant heater 12 is controlled to be in the OFF state, and this control process ends.

The method of detecting the presence or absence of the passenger 4 in step S502 is not limited to the above described method using the IR sensor 19. For example, the seating signal input from the seat sensor 15 or the buckle connection signal input from the buckle connection sensor 18 may be used in combination as well.

In the radiant heater device 10B of the third embodiment, the above mentioned "control output of the radiant heater 12 based on the information related to the thermal sensation of the passenger 4" refers to the following specific configuration. That is, the heater controller 11B uses the surface temperature of the passenger 4 detected by the IR sensor 19 as "information related to the thermal sensation of the passenger 4" and sets the target temperature of the radiant heater 12 based on this surface temperature.

It is considered that the surface temperature of the passenger 4 (for example, the portion below the knee of the passenger 4 to which radiant heat is supplied by the radiant heater 12) detected by the IR sensor 19 has a high correlation with the thermal sensation of the passenger 4. For example, it is considered that if this surface temperature is low, the body of the passenger 4 is cold and thermal sensation is low, and if this surface temperature is high, the body of the passenger 4 is sufficiently warmed and thermal sensation is high. However, as described above, by setting the target temperature of the radiant heater 12 based on the surface temperature, it is possible to provide an appropriate heating according to the thermal sensation of the passenger 4.

Further, it is considered that the information of the surface temperature of the passenger 4 detected by the IR sensor 19 is strongly correlated with the "information related to the thermal sensation of the passenger 4". Therefore, by using the passenger surface temperature as input information, it is possible to accurately estimate the thermal sensation of the passenger 4, and the output of the radiant heater 12 may be further controlled in accordance with the thermal sensation of the passenger 4. In the radiant heater device 10B of the third embodiment, it is also possible to replace the IR sensor 19 with another sensor that can measure the surface temperature of the passenger 4.

Modified Example

Figure 14:
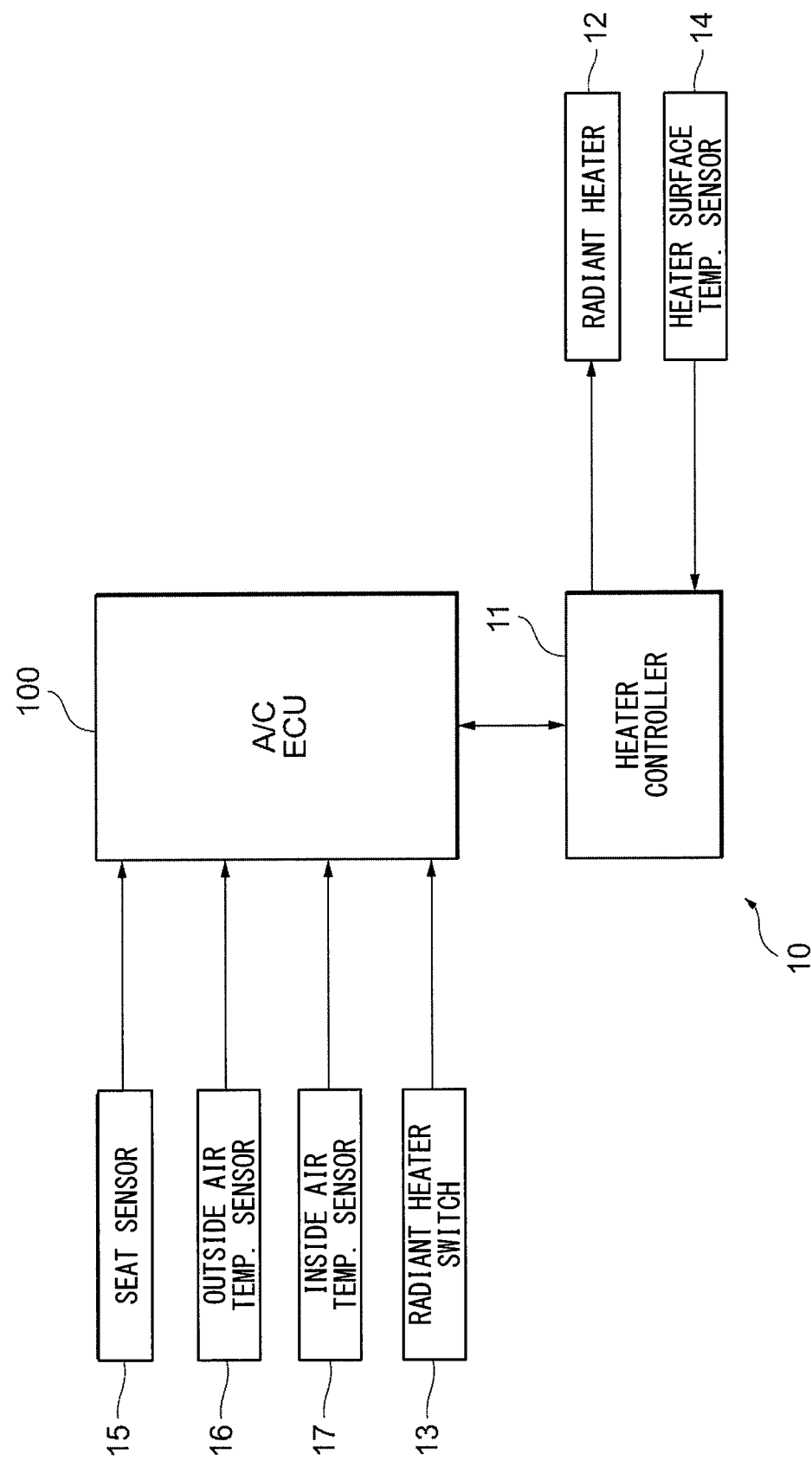
FIG. 14 is a block diagram showing a configuration of a modified example embodiment.

A modification of the above embodiments will be described with reference to FIG. 14. In the first to third embodiments, exemplary configurations are provided where the various sensors are electrically connected to the heater controllers 11, 11A, 11B of the radiant heater devices 10, 10A, 10B, and the signals are directly input from the various sensors. However, the radiant heater devices 10, 10A, 10B are not limited to these configurations. For example, as shown in FIG. 14, various sensors are electrically connected to an A/C ECU 100 which is superior to the heater controller 11, 11A, 11B. The A/C ECU 100 sends the signals input from the various sensors to the heater controller 11, 11A, 11B, and the heater controller 11, 11A, 11B controls the radiant heater 12 based on the various sensor signals received from the A/C ECU 100. This configuration may be used as well.

The embodiments of the present disclosure have been described with reference to specific examples above. However, the present disclosure is not limited to these specific examples. Those skilled in the art appropriately design modifications to these specific examples, which are also included in the scope of the present disclosure as long as they have the features of the present disclosure. For example, the elements, the arrangement, materials, the conditions, the shape, the size, etc. of the specific examples described above are not limited to those exemplified and can be appropriately modified. In addition, each element included in each of the above described embodiments may be combined with each other where technically permitted, and these combinations are also included in the scope of the present disclosure as long as the features of the present disclosure are included.

The method of correction to raise the target temperature of the radiant heater 12 based on the elapsed time after the passenger 4 enters the vehicle shown in the first and second embodiments and the method of setting the target temperature of the radiant heater 12 based on the surface temperature of the passenger 4 shown in the third embodiment may be combined with each other.

Further, in the first to third embodiments, as a determination method of whether or not the passenger 4 is seated on the seat 3, exemplary configurations are provided where a seating signal of the seat sensor 15, a buckle connection signal of the buckle connection sensor 18, and an IR sensor signal of the IR sensor 19 are used. However, these signals may be used in combination as well.

Further, in the first and second embodiments, an exemplary configuration is illustrated in which it is determined whether or not the passenger 4 is seated on the seat 3. However, this configuration may determine again whether or not the passenger is in a seated state within a predetermined time unit (for example, several seconds to several tens of seconds) after non-seating is determined. In other words, in the first embodiment, after non-seating is determined, the detection of the seating state of the passenger 4 by the seat sensor 15 (that is, the process of step S102) may be performed again within a predetermined time unit (for example, several seconds to several tens Second). Further, in the second embodiment, after non-seating is determined, the detection of the seating state of the passenger 4 by the buckle connection sensor 18 (that is, the process of step S402) may be performed again within a predetermined time unit (for example, several seconds to several tens Second).

According to this configuration, if it is determined that the passenger 4 is not seated during the process of step S102 despite the fact that the passenger 4 is substantially in a seated state, immediately after this determination (for example, within several seconds to several tens of seconds), it can be detected that the passenger 4 is seated. Thus, even when it is determined that the passenger 4 is not seated in this way, it can be detected that the passenger 4 is seated.

Further, when detecting that the passenger 4 is seated in this way, subsequent processes (that is, the process of steps S103 to S105, S106, etc.) may be performed as well. It should be noted that, as "a case where it is determined that the passenger 4 is not seated despite the fact that the passenger 4 is substantially in a seated state", for example, it is considered that after the passenger 4 sits down, the passenger 4 may reseat themselves to change posture, or momentarily leave the seat to pick up or drop off passengers when the vehicle is stopped, etc.

Similarly to this, in the third embodiment, after it is determined that the passenger 4 is not present, within a predetermined time unit (for example, several seconds to several tens of seconds), it may be determined again whether the passenger 4 is present or not. In this configuration as well, the same effect as described above can be obtained. That is, in the case of this configuration, even in the case where it is determined that the passenger 4 is not present even though the passenger 4 is substantially present, it is possible to detect that the passenger 4 is present. In addition, when detecting that the passenger 4 is present as described above, subsequent processes (that is, the process of steps S503 and S504) may be performed as well.

What is claimed is:

1. A radiant heater device, comprising:
a radiant heater that radiates radiant heat to a passenger of a vehicle;
a controller that controls an output of the radiant heater; and
a seat sensor that detects a seating state of the passenger, wherein
the controller acquires information related to a thermal sensation of the passenger and controls the output of the radiant heater based on the information related to the thermal sensation, and
the controller calculates, as the information related to the thermal sensation, an elapsed time after the passenger enters the vehicle based on information of the seating state detected by the seat sensor, and switches a calculation method of a target temperature of the radiant heater based on the elapsed time.

2. A radiant heater device, comprising:
a radiant heater that radiates radiant heat to a passenger of a vehicle;
a controller that controls an output of the radiant heater; and
a seatbelt sensor that detects a seatbelt wearing state of the passenger, wherein
the controller acquires information related to a thermal sensation of the passenger and controls the output of the radiant heater based on the information related to the thermal sensation, and
the controller calculates, as the information related to the thermal sensation, an elapsed time after the passenger enters the vehicle based on information of the seatbelt wearing state detected by the seatbelt sensor, and switches a calculation method of a target temperature of the radiant heater based on the elapsed time.

3. The radiant heater device of claim 1, wherein
the controller
sets the target temperature based on an inside air temperature, which is a temperature inside a passenger compartment of the vehicle, when the elapsed time is equal to or greater than a predetermined value, and
performs a correction to raise the target temperature when the elapsed time is less than the predetermined value.

4. The radiant heater device of claim 3, wherein
the controller performs the correction such that as the elapsed time is shorter, a raise amount of the target temperature is increased.

5. The radiant heater device of claim 4, wherein
the controller performs the correction such that as an outside air temperature, which is a temperature outside of the vehicle, is lower with respect to the inside air temperature, the raise amount of the target temperature is increased.

6. The radiant heater device of claim 1, further comprising:
a temperature sensor that detects a surface temperature of the passenger, wherein
the controller uses the surface temperature detected by the temperature sensor as the information related to the thermal sensation, and sets the target temperature of the radiant heater based on the surface temperature.

* * * * *